US006779827B2

(12) United States Patent
Clark

(10) Patent No.: US 6,779,827 B2
(45) Date of Patent: Aug. 24, 2004

(54) AUTOMOBILE COVER

(76) Inventor: Garry E. Clark, 399 Castle Ave., Winder, GA (US) 30680

( * ) Notice: Subject to any disclaimer, the term of this patent is extended or adjusted under 35 U.S.C. 154(b) by 0 days.

(21) Appl. No.: 10/438,091

(22) Filed: May 14, 2003

(65) Prior Publication Data
US 2003/0226627 A1 Dec. 11, 2003

Related U.S. Application Data
(60) Provisional application No. 60/380,202, filed on May 14, 2002.

(51) Int. Cl.[7] .................................................. B60J 7/20
(52) U.S. Cl. .................. 296/98; 296/136.01; 296/136.1
(58) Field of Search ....................... 296/136.01, 136.02, 296/136.03, 136.07, 136.1, 136.11, 136.13, 98

(56) References Cited
U.S. PATENT DOCUMENTS
2,751,977 A * 6/1956 Pinkerton ................ 160/368.1

5,615,923 A    4/1997 Madison

* cited by examiner

Primary Examiner—Joseph D. Pape
(74) Attorney, Agent, or Firm—Hinkle & O'Bradovich, LLC

(57) ABSTRACT

An automobile cover apparatus and system is described. The automobile cover generally includes a main cover body having a hood end, a trunk end, an upper surface and a lower surface, connectors located on the hood end and the trunk end, trunk cords connected to the connectors on the trunk end, a trunk anchor connected to the trunk cords on ends of the trunk cords opposite the ends connected to the connectors, hood cords connected to the connectors on the hood end and a hood connection device connected to each of the hood cords opposite the ends connected to the connectors. The cover can be combined with a winder for a automobile cover kit.

6 Claims, 6 Drawing Sheets

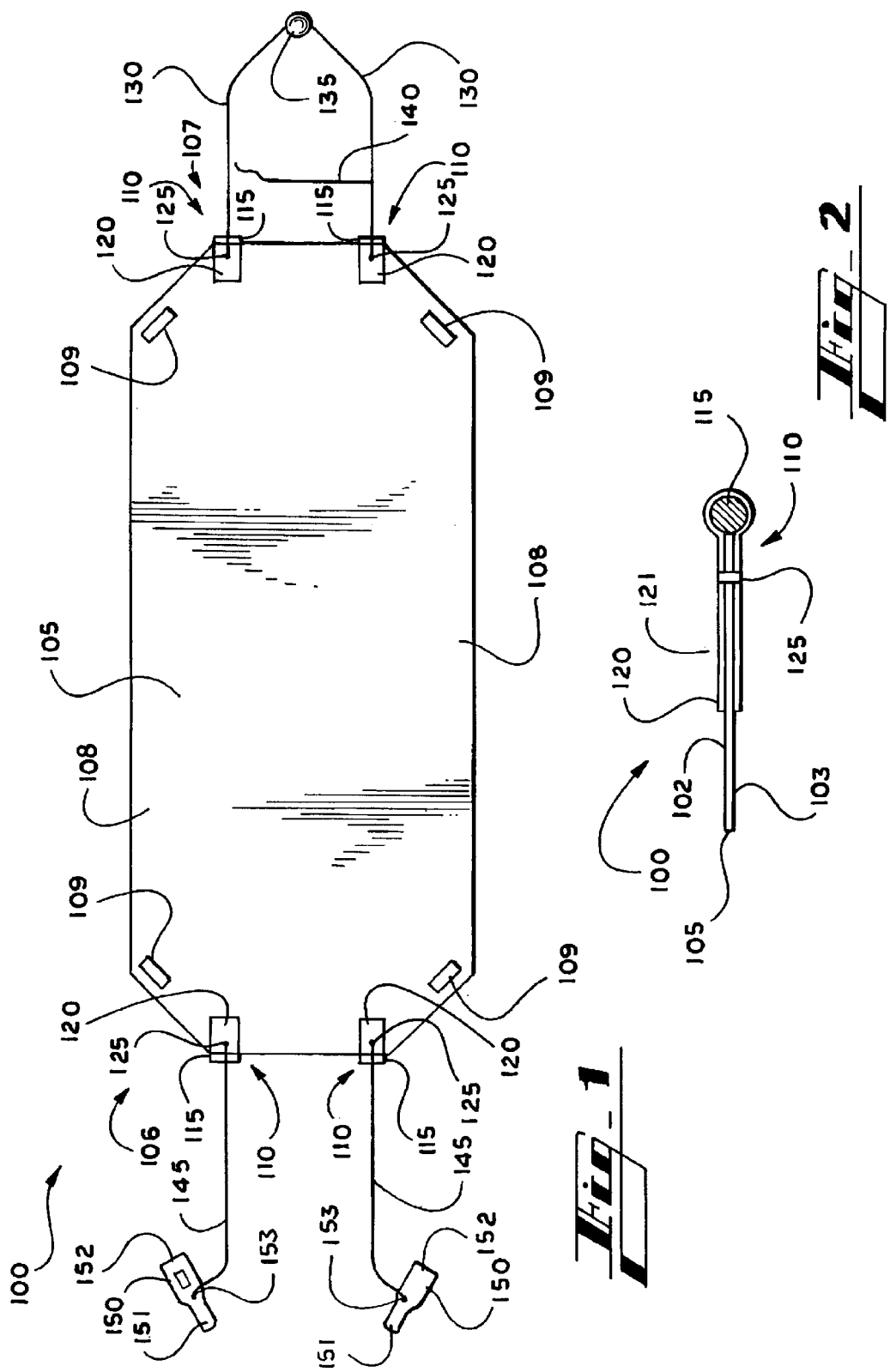

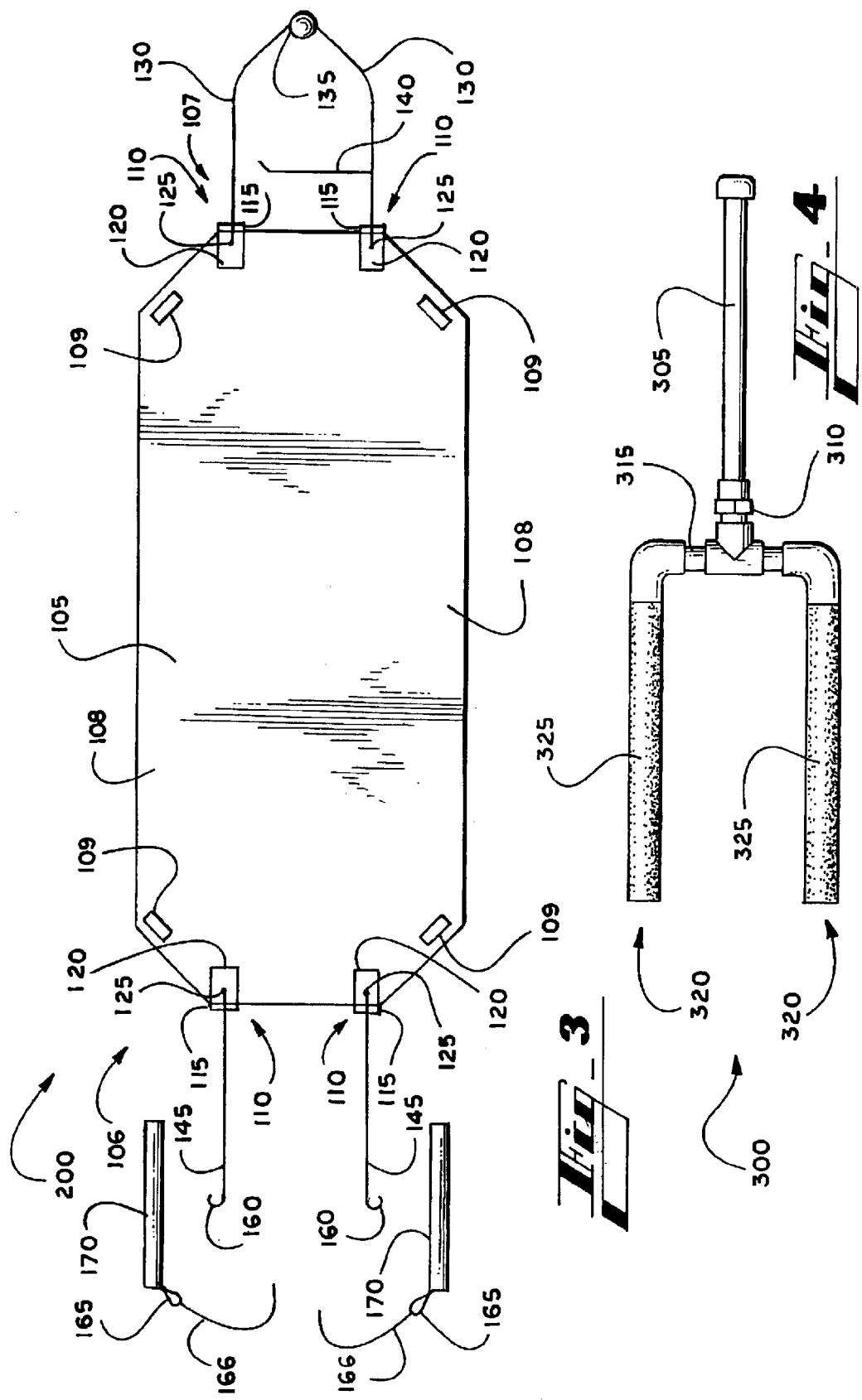

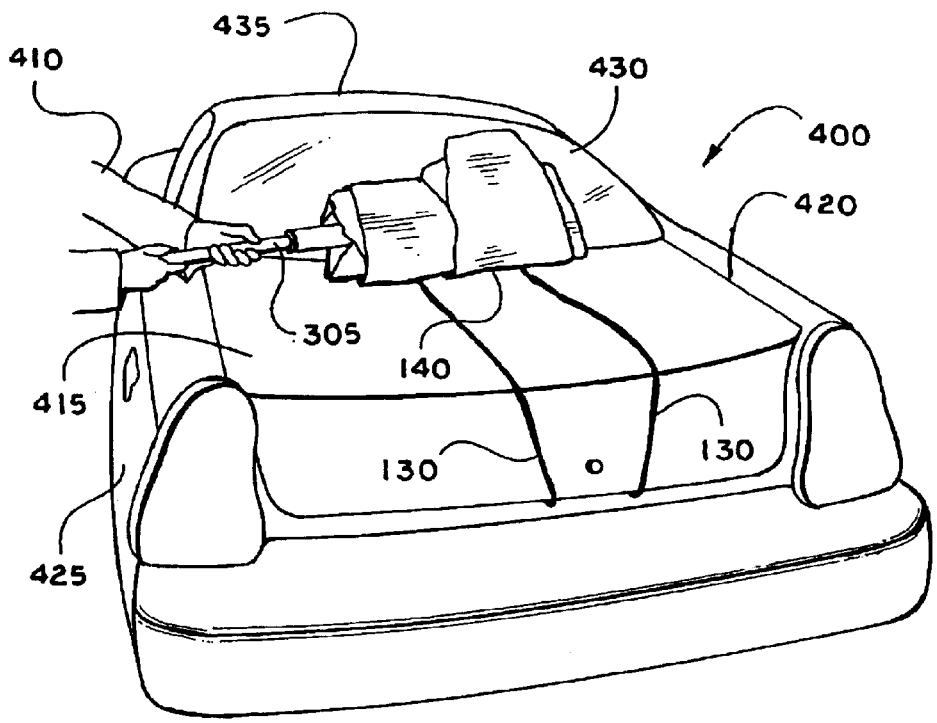
Fig_7
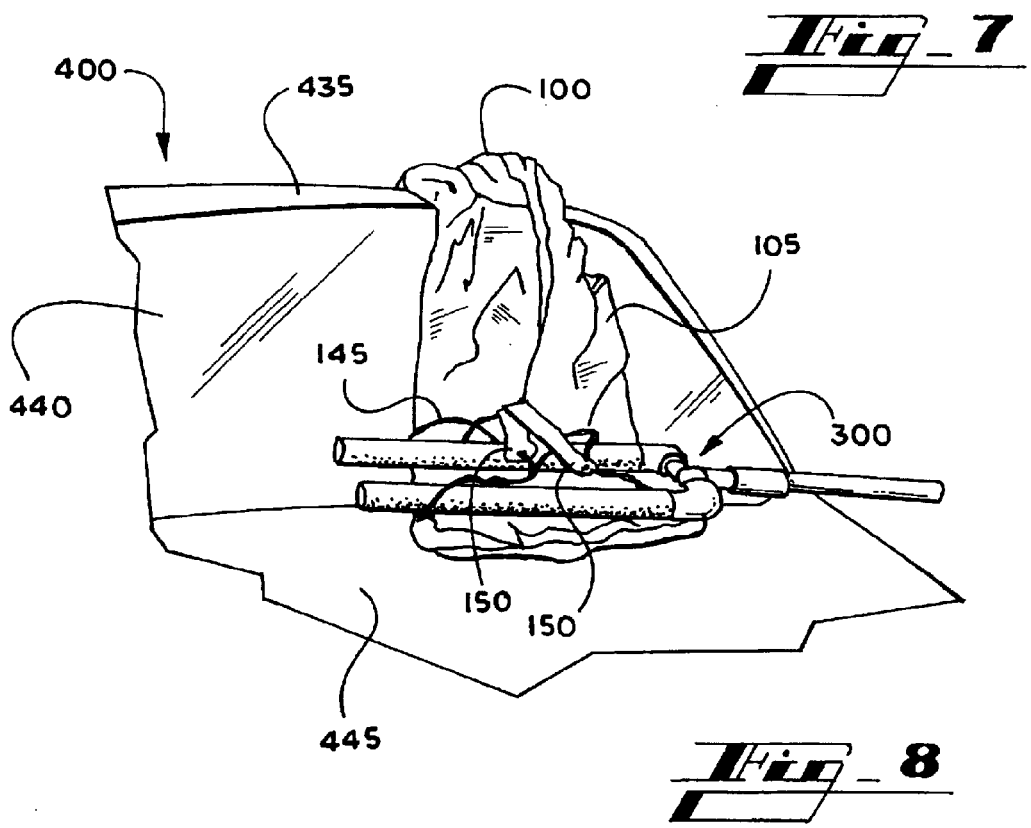
Fig_8

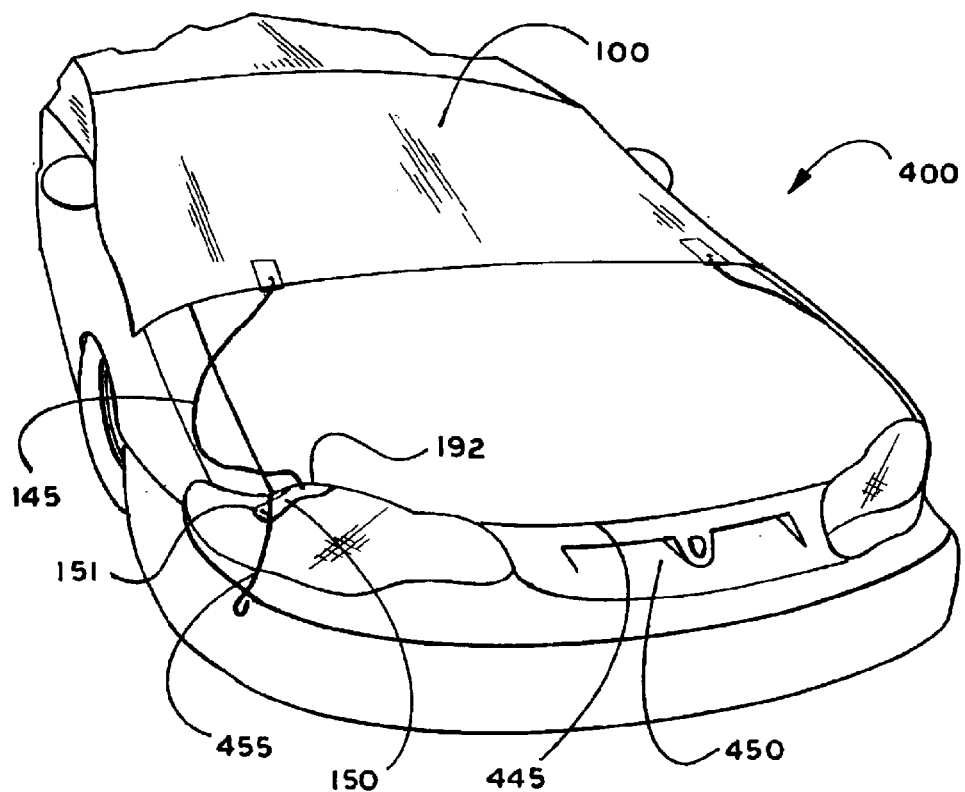
Fig_9
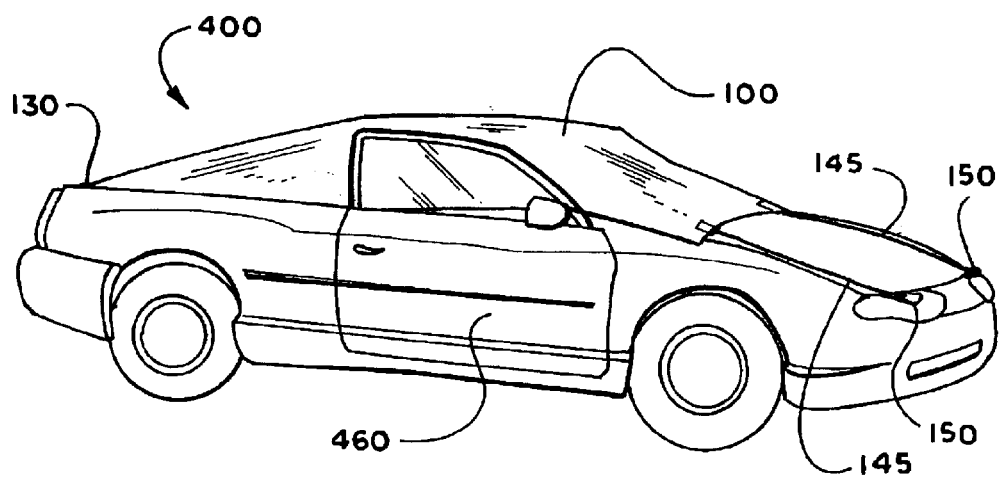
Fig_10

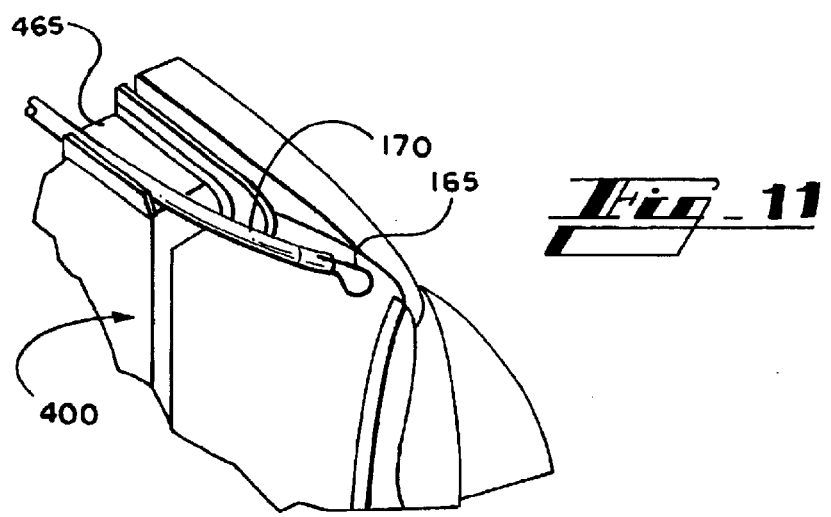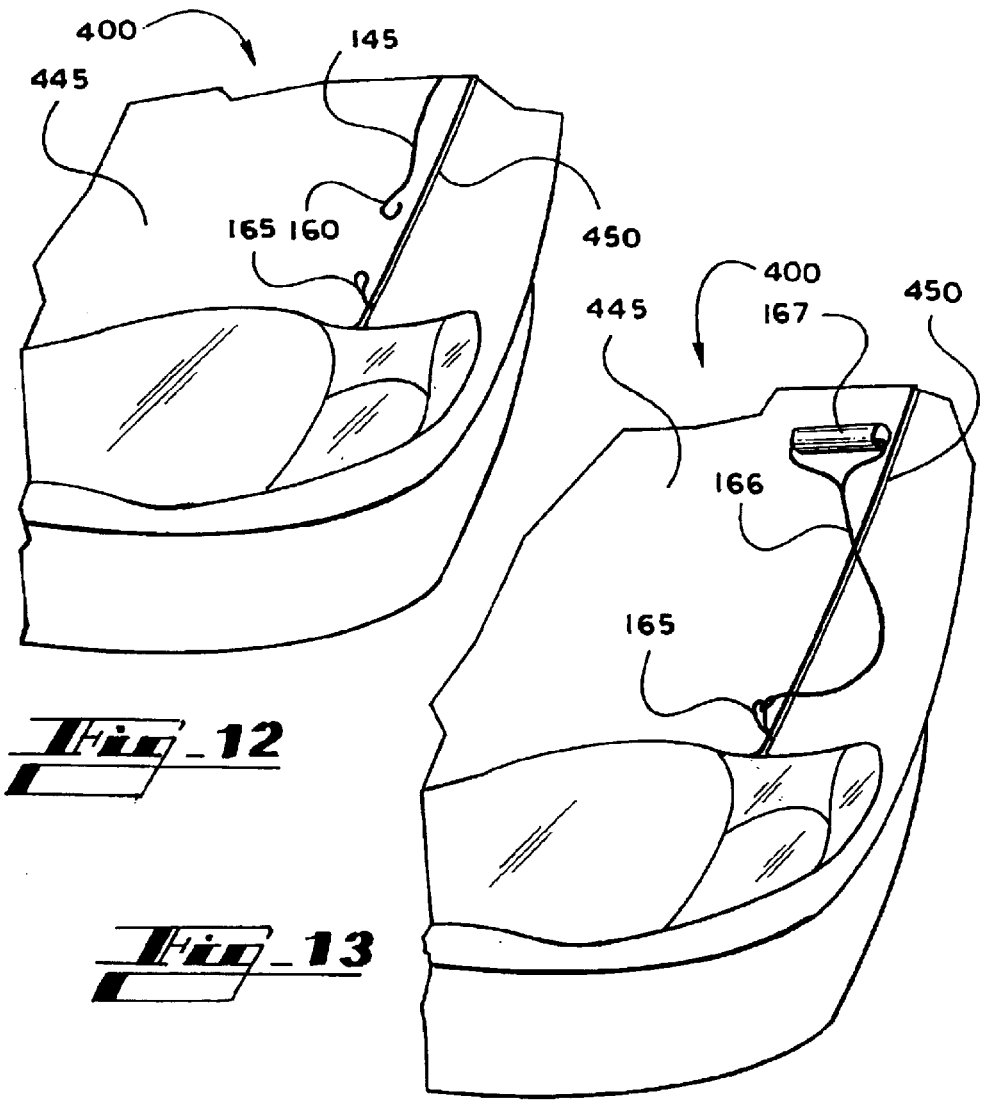

AUTOMOBILE COVER

Priority is claimed based on U.S. Provisional Patent Application, Ser. No. 60/380,202, filed on May 14, 2002, entitled "Space-Age Auto Shade".

BACKGROUND OF THE INVENTION

I. Field of the Invention

The present invention relates generally to the field automobile protective covers, and more particularly to an apparatus and system for preventing the interior of an automobile from heating to high temperatures.

II. Description of the Related Art

Existing car covers are primarily used to protect vehicles from dust and dirt. They are used when parking a vehicle for an extended period of time. These covers typically do not require rapid deployment and removal features. Furthermore, these car covers typically do not prevent heat build-up in the interior of the vehicle. Parked automobiles can be heated to extreme temperatures, especially when parked in direct sunlight. As such, upholstery, seat belts and seat belt connectors, gear shift levers, child car seats and other interior objects can absorb the sun's energy, potentially heating the objects to temperatures reaching 140° F. to 160° F. This heating can cause discomfort and injury to the vehicle's occupants and can damage the interior objects from extended ultraviolet energy, thereby reducing the objects' useful life. Most of the sun's energy enters the automobile through the windshield, back window and side windows, and partially through the roof of the automobile, especially if equipped with a sun roof.

In order to reduce the heat in the interior of the automobile, the occupants typically keep the doors of the automobile open or start the car with the air conditioning running and wait until the interior is cool enough to enter the automobile. This extra time can cause an extra load on the engine, thereby using extra fuel. Sun-shield devices and tinted glass are often used to attempt to alleviate interior heating. However, these devices are typically inefficient and the automobile's interior heats to similar temperatures as those automobiles without the devices, but over a longer period of time. In addition, automobile owners often park under trees or other objects that can leak sap or drop leaves onto the automobile.

SUMMARY

In general, the invention features an externally affixed automobile cover that prevents the interior of the automobile from excessive heating.

In general, in one aspect, the invention features an automobile cover apparatus, including a main cover body having a perimeter a hood end, a trunk end, an upper surface and a lower surface, connectors located on the hood end and the trunk end, trunk cords connected to the connectors on the trunk end, a trunk anchor connected to the trunk cords on ends of the trunk cords opposite the ends connected to the connectors, hood cords connected to the connectors on the hood end, a hood connection device connected to each of the hood cords opposite the ends connected to the connectors.

In one implementation, the main cover body is reflective.

In another implementation, the main cover body comprises layer of aluminum fused to a layer of polyester, wherein the aluminum layer is encapsulated in a layer of polyethylene.

In another implementation, each of the connectors a cylindrical rod connected generally parallel to at least one of the hood end and the trunk end, tape wrapped around a portion of the cylindrical rod and connected to the upper surface and the lower surface of the main cover body and a hole through the tape and the main cover body and adjacent the cylindrical rod.

In another implementation, the tape includes internal threads.

In still another implementation, the trunk cords are shock cords.

In yet another implementation, the trunk anchor is a rubber ball.

In another implementation, the hood connection device is a hood lug.

In another implementation, the hood lugs comprise a handle end opposite a paddle end and a hole located between the handle end and the paddle end.

In another implementation, the hood connection device includes a hooking device connected to the hood cords and an elongated flexible body having a loop being connected to the hooking device.

In another implementation, the apparatus further includes a pull-string connected to the loop.

In another implementation, the apparatus further includes a cord loop connected between the trunk cords.

In another implementation, the apparatus further includes weights connected along the perimeter of the main cover body.

In another aspect, the invention features an automobile cover kit, including a car cover apparatus having a main cover body having a hood end, a trunk end, an upper surface and a lower surface and adapted to cover an automobile cabin, connectors located on the hood end and the trunk end, trunk cords connected to the connectors on the trunk end, a trunk anchor connected to the trunk cords on ends of the trunk cords opposite the ends connected to the connectors, the trunk anchor being adapted to be placed in a trunk of the automobile, hood cords connected to the connectors on the hood end and a winder having an elongated handle connected generally perpendicular to a cross bar and two tangs connected generally perpendicular to the cross bar, the winder being adapted to roll the cover onto the tangs.

In one implementation, the kit further includes a hood connection device connected to the hood cords.

In another implementation, the hood connection device is a hood lug adapted to connected to a gap between a hood of the automobile and a mating surface of the hood.

In another implementation, the hood connection device includes a hooking device connected to the hood cords and an elongated flexible body having a loop adapted to be connected to the hooking device, the elongated flexible body being adapted to be placed into a hood fender gap of the automobile and the loop being adapted to protrude from a gap between a hood of the automobile and a mating surface of the hood.

In another implementation, the kit further includes a pull-string connected to the loop and adapted to fit into the gap between the hood gap and the mating surface.

In another implementation, the kit includes a cord loop that is adapted to be connected to itself end to end and further adapted to be connected between the trunk cords.

In another aspect, the invention features an automobile cover apparatus including a main cover body having a hood end, a trunk end, an upper surface and a lower surface, connectors located on the hood end and the trunk end, trunk cords connected to the connectors on the trunk end, trunk anchor connected to the trunk cords on ends of the trunk cords opposite the ends connected to the connectors, hood cords connected to the connectors on the hood end and means to connect the end of the hood cords to the hood of the automobile.

One advantage of the invention is that the cover can be rapidly and easily placed and removed rapidly while maintaining overall control of the cover.

Another advantage of the invention is that the four corners of the cover can be controlled through the placement and removal of the cover, thereby allowing the cover to be used in different weather conditions, such as windy weather.

Another advantage of the invention is that any excess cover can be draped over the hood and trunk areas of the automobile, acting as a heat dissipater.

Another advantage of the invention is that the cover material efficiently blocks the sun's energy and yet remains lightweight.

Another advantage of the invention is that occupants can rapidly enter their automobile into a comfortable temperature and air conditioners can reduce the temperature to a desired level more rapidly.

Another advantage of the invention is that fuel savings are realized since the air conditioner is not required to work harder to cool an automobile covered by the automobile cover.

Another advantage of the invention is that sun exposure on interior objects is greatly reduced, thereby increasing their useful life.

Another advantage is that sap and other debris falling onto automobiles is reduced because automobile owners do not have to park under trees for shade.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates a top view of an embodiment of an automobile cover apparatus in an open position;

FIG. 2 illustrates a partial side view of the embodiment of the automobile cover of FIG. 1;

FIG. 3 illustrates a top view of an alternate embodiment of an automobile cover apparatus in an open position;

FIG. 4 illustrates a perspective view of an embodiment of a winder;

FIG. 7 illustrates an embodiment of an automobile cover partially unrolled from an embodiment of a winder and in process of covering an automobile;

FIG. 8 illustrates an embodiment of an automobile cover unrolled from an embodiment of a winder;

FIG. 9 illustrates an embodiment of an automobile cover placed over an automobile;

FIG. 10 illustrates an embodiment of an automobile cover placed over an automobile;

FIG. 11 illustrates an alternate embodiment of a hood connection device underneath the hood of an automobile;

FIG. 12 illustrates an alternate embodiment of a hood connection device underneath the hood of an automobile;

FIG. 13 illustrates an alternate embodiment of a hood connection device having a pull string;

DETAILED DESCRIPTION

Figure 5:
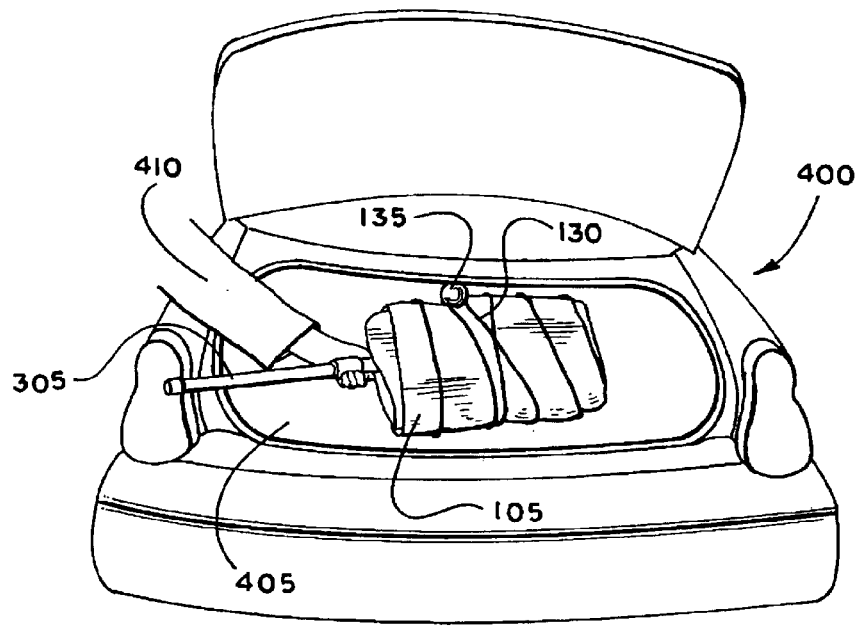
FIG. 5 illustrates an embodiment of a automobile cover wrapped over itself and onto an embodiment of a winder.

The figures below illustrate a car being used with embodiments of an automobile cover. It is understood that the embodiments can be used with any automobile including but not limited to cars, trucks and sports utility vehicles.

Automobile Cover Apparatus and System

Referring to the drawings wherein like reference numerals designate corresponding parts throughout the several figures, reference is made first to FIG. 1 that illustrates a top view of an embodiment of an automobile cover 100 in an open position. The cover 100 typically includes a main cover body 105 having a hood end 106 and a trunk end 107. Typically, the main cover body 105 is a sun reflecting material, which can be any commercially available material. In one embodiment, a radiant barrier or metallized polyester thin film is used. This material typically includes a layer of aluminum fused to a layer of polyester. The aluminum layer is encapsulated in a layer of black polyethylene. Due to the smoothness of the thin film and different expansion ratios between the polyester and the polyethylene, the thin film material tends to roll-up along the edges. A crumple zone 108 is therefore formed around the outer perimeter of the body 105. The process creating the crumple zone causes a series of wrinkles and creases in the thin film material in the crumple zone, thereby causing the crumple zone to become rigid, thereby preventing rolling-up. Several weights 109 can be connected along the edges of the body 105. Typically, the weights 109 are soft material or covered in soft material.

The cover 100 further includes connectors 110 located on the edges of the hood end 106 and the trunk end 107. The connectors 110 include a cylindrical rod 115, such as a dowel, located generally parallel to the edge of the hood end 106 and trunk end 107. The cylindrical rods 115 are held in place by a filament, adhesive tape or other suitable tape 120 to keep the cylindrical rod 115 in place. In one embodiment, the tape 120 is a tape that includes a series of threads, such as strapping tape. The tape 120 is typically wrapped around the body 105 so that it is connected to the upper surface 102 and lower surface 103 of the body (see FIG. 2 below). Each connector 110 further includes a hole 125 through the tape 120 and the body 105. Each hole 125 is adjacent each cylindrical rod 115.

The cover 100 further includes trunk cords 130, one end of which is connected through the holes 125 on the trunk end 107 of the body 105. The other ends of the trunk cords 130 are connected to a trunk anchor 135, which is typically a spherical body 135. The end of the cords 130 connected to the holes 125 can be tied onto itself and knotted to secure the cords 130 to the holes 125. Additional bands or braces can be connected around the knot to further secure the cords 130 to the holes 125. In another embodiment, a single cord 130 is connected through the spherical body 135 and each end of the cord 130 is connected to a respective hole 125 on the trunk end 107. In one implementation, the cords 130 are shock cords. In one implementation, the shock cords can be bungee cords. The trunk cords 130 are therefore typically elastic. In another embodiment, the cords 130 can be separated into two separate cords, one connected to the body 105 and the other connected to the trunk anchor 135. The two pieces of cords can be connected together by a hooking device such as a snap hook on one piece and a loop on the other piece. In a typical implementation, the cord piece connected to the body can be a shock cord, and the piece connected to the anchor can be non-elastic such as nylon. A cord loop 140 is connected between the cords 130 and is adapted to be easily removed as discussed further in the description below.

The cover further includes hood cords 145, one end of which is connected through the holes 125 on the hood end 106 of the body 105. The other ends of the hood cords 145 are connected to a suitable hood connection device, which can be hood lugs 150. The hood cords 145 are typically non-elastic and can be nylon. Each of the hood lugs 150 generally includes a handle end 151, a paddle end 152 and a hole 153 located generally at or toward the center of the hood lug 150. The end of the hood cords 145 connected to the hood lugs 150 are connected through the hole 153 and knotted or other wise secured to the lugs 150. An alternate hood connecting device is discussed in further detail below.

By including the cylindrical rod 115 adjacent the hole 125, tension forces on the trunk cords 130 and the hood cords 145 are distributed evenly on the cylindrical rod 115 and therefore on the tape 120 and the threads within the tape 120. As such, tears on the cover 100 are less likely.

FIG. 2 illustrates a partial side view of the embodiment of the automobile cover 100 of FIG. 1. The body 105 is shown including a connector 110 having a cylindrical rod 115 wrapped with tape 120 connected to both the upper surface 102 and lower surface 103 of the body 105. The hole 125 is adjacent the cylindrical rod 115 and runs through the tape 120 and the body 105. In another implementation, a reflective covering 121 can be placed over the tape 120 to preserve the tape 120.

FIG. 3 illustrates a top view of an alternate embodiment of an automobile cover apparatus 200 in an open position. The cover 200 is similar to the cover 100 described above. The cover 200 typically includes a main cover body 105 having a hood end 106 and a trunk end 107. Typically, the main cover body 105 is a sun reflecting material with the same properties as described with respect to FIG. 1, which includes a crumple zone 108. In addition, several weights 109 can be connected along the edges of the body 105 as described above.

The cover 200 further includes connectors 110 located on the edges of the hood end 106 and the trunk end 107. The connectors 110 include a cylindrical rod 115 located generally parallel to the edge of the hood end 106 and trunk end 107. The cylindrical rods 115 are held in place by a filament, adhesive tape or other suitable tape 120 to keep the cylindrical rod 115 in place. The tape 120 is typically wrapped around the body 105 so that it is connected to the upper surface 102 and lower surface 103 of the body (see FIG. 2 below). Each connector 110 further includes a hole 125 through the tape 120 and the body 105. Each hole 125 is adjacent each cylindrical rod 115.

The cover 200 further includes trunk cords 130, one of which is connected through the holes 125 on the trunk end 107 of the body 105. The other ends of the trunk cords 130 are connected to a trunk anchor 135, which is typically a spherical body 135. The end of the cords 130 connected to the holes 125 can be tied onto itself and knotted to secure the cords 130 to the holes 125. Additional bands or braces can be connected around the knot to further secure the cords 130 to the holes 125. In another embodiment, a single cord 130 is connected through the spherical body 135 and each end of the cord 130 is connected to a respective hole 125 on the trunk end 107. In one implementation, the cords 130 are shock cords. A cord loop 140 is connected between the cords 130 and is adapted to be easily removed as discussed further in the description below.

The cover further includes hood cords 145, one end of which is connected through the holes 125 on the hood end 106 of the body 105. A hooking device 160 is connected to the other ends of the hood cords 145. The hooking device 160 can be any suitable hook, snap hook and the like. The hooking device 160 is adapted to hook to a loop 165 that is connected to one end of an elongated flexible body 170. In one implementation, the flexible body 170 is a hose. It is understood that there are many suitable devices that can be used to hook to the loop 165. The loop 165 can optionally have a pull-string 166 connected to the loop 165. In contrast to the hood lugs 150 described above with respect to FIG. 1, the hooking device 160 used in conjunction with the flexible body 170 having the loop 165 operates as an alternate hood connection device.

FIG. 4 illustrates a perspective view of an embodiment of a winder 300. The winder 200 typically includes an elongated handle 305 connected and generally perpendicular to a cross bar 315. The handle 305 can optionally include a gripping surface 310. In one embodiment, the handle 305 can be in threaded engagement with the cross bar 315 so that the handle 305 can be removed from the remainder of the winder 300. In another embodiment, the handle 305 can rotate with respect to the remainder of the winder 300. Two elongated tangs 320 are connected to opposite ends of the cross bar 315. The tangs 320 are generally perpendicular to the cross bar 315. The tangs 320 can include a soft covering 325. In one implementation, the soft covering is a sponge material. It is understood that other suitable materials can be used for the soft covering 325. The soft covering 325 can be located as various areas of the winder 300 where the winder 300 can potentially contact the surfaces of an automobile, thereby preventing scratches.

The winder 300 can be used in conjunction with the car cover embodiments described above in order to place and remove the covers from automobiles. The embodiments of the covers including either or both of the hooking devices, that is, the hood lugs 150 and the elongated body 170 and hooks 160 and the winder can be used together as an automobile cover kit.

Automobile Cover Operation

In general, the embodiments described above can be used in order to cover the cabin portion of an automobile to prevent overheating of the interior of the automobile. The operation of the automobile cover is now described.

FIG. 5 illustrates the embodiment of the automobile cover wrapped 100 over itself and onto an embodiment of a winder 300. The automobile cover 100 is shown in the trunk 405 of an automobile 400, with a user 410 gripping the handle 305 of the winder 300. The body 105 is wrapped over itself and on the tangs 320 of the winder 300. The trunk cords 130 are show wrapped around the cover 105, and the trunk anchor 130 is shown laying on the rolled-up body 105. The trunk 405 of an automobile is a typical storage place for the cover 100 and the winder 300 together as a system.

Figure 6:
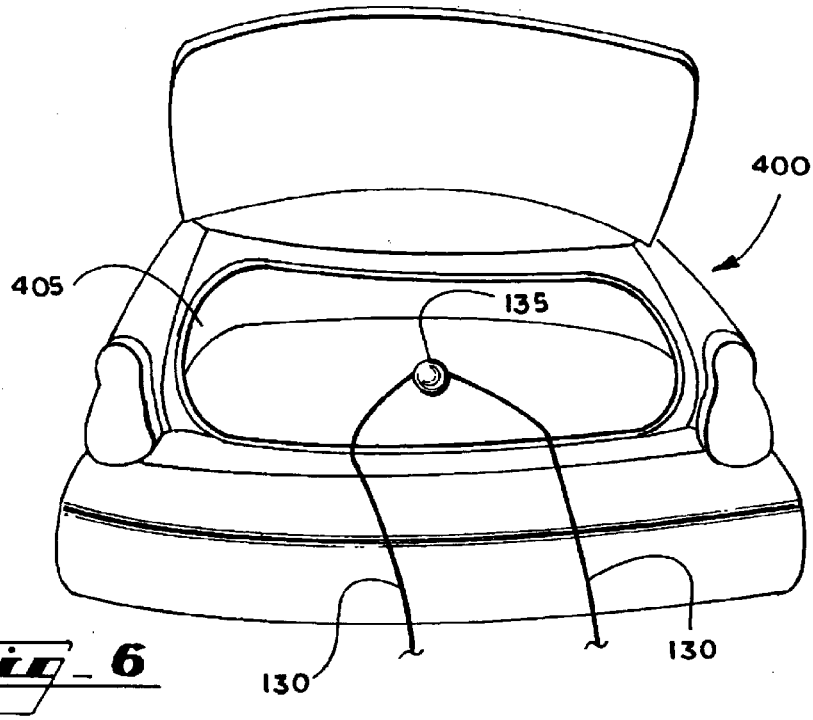
FIG. 6 illustrates an embodiment of a trunk anchor connected to trunks cords and placed within a trunk of an automobile.

FIG. 6 illustrates an embodiment of a trunk anchor 135 connected to trunks cords 130 and placed within a trunk 405 of an automobile 400. In a typical implementation, the trunk anchor 130 is left inside the trunk 405 and the rest of the cover 100 is pulled out from the trunk 405 and partially unrolled from the winder 300. The trunk cords 130 are left hanging from the trunk 405.

FIG. 7 illustrates an embodiment of an automobile cover 100 partially unrolled from an embodiment of a winder 300 and in process of covering an automobile 400. Typically, the trunk lid 415 is closed with the trunk anchor 135 remaining in the trunk 405. The trunk cords 130 protrude from the gap 420 left between the trunk lid 415 and its mating surface 425, such as the rear quarter panel and upper rear fender. Slack in the trunk cords 130 can then be pulled from the trunk 405, which can be enabled by the trunk cords being pulled from the gap 420. Since the trunk anchor 135 is much larger than the gap 420, it remains securely fit within the trunk 405. In this way, the user 410 retains control of the cover 100 in windy conditions and the like. The user 410 can then continue to unroll the cover 100 from the winder 300 by rotating the handle 305. Typically, the rear window 430 and roof 435 of the automobile 400 are partially covered first. The cord loop 140 is shown connected between the trunk cords 130. At this point the cord loop 140 can be removed and stored. The cord loop 140 is typically used to maintain control on the cover 100 as it is unrolled from the winder 300. The cord loop 140 can also be connected around the trunk end 107 of the body 105. In a typical embodiment, the cord loop 140 is connected one end to the other with a suitable connecting device.

FIG. 8 illustrates an embodiment of an automobile cover 100 unrolled from an embodiment of a winder 300. The cover 100 now partially covers the windshield 440 of the automobile 400. The winder 300 is free from the cover 100 and can now be removed and stored, typically in the interior of the automobile 400. With the cover 100 unrolled, the hood cords 145 and the hood lugs 150 are now exposed. The user 410 maintains control of the cover 100 because the trunk anchor 135 is secure in the trunk 405 and the user 410 can take hold of the lugs 150. At this point the user 410 can separate the lugs 150 and fully open the cover over the rear window 430, the roof 435 and the windshield 440. The user 410 can spread the cover 100 similar to how a person spreads a sheet, but with the trunk cords 130 fixed. Since the trunk cords 130 are typically elastic, the user 410 has freedom of motion in pulling the cover 100 toward the hood 445 of the automobile 400. As the cover 100 is spread open, the weight 109 can aid in allowing the sides of the body 105 to hang over the sides of the automobile 400.

FIG. 9 illustrates an embodiment of an automobile cover 100 placed over an automobile 400. After the body 105 of the cover 100 is spread over the automobile 400. The user 410 then places the paddle end 152 of the lugs 150 in the gap 450 between the hood 445 and its mating surface 455. The mating surface can be the front fender or the headlights. Typically, the lugs are placed in the gap 450 between the hood 445 and the head lights since this gap 450 is nearest to the very front corners of the automobile 400. The elastic trunk cords 130 can be spread out and secured in the gap 420, typically at the corners of the trunk lid 415 to obtain the widest spread of the cover 100. At this point there may still be some slack in the non-elastic hood cords 145.

FIG. 10 illustrates an embodiment of a automobile cover 100 placed over an automobile 400. As described above, the hood cords 145 may still contain some slack. Since the trunk cords 130 are typically elastic, they take up tension as the cover 100 is placed over the automobile. In order to further secure the cover 100 on the automobile 400. The doors 460 of the automobile 400 can be opened and the sides of the cover 100 can be allowed to hang into the interior of the automobile 400. The weights 109 allow the cover 100 to more easily hang down the sides of the automobile 400. Once the cover 100 is hanging into the interior. The doors 460 can be closed on the cover 100 providing another point of securement of the cover 100 to the automobile 400. The hood cords 145 are typically tense when the doors 460 are closed on the cover 100 in this manner.

FIGS. 5–10 described the embodiment of the cover 100 using the hood lugs 150 as a hood connection device. As described above with respect to FIG. 3, the hooking device 160 connected to the other ends of the hood cords 145 and the loop 165 that is connected to one end of an elongated flexible body 170 can be used as an alternate hood connection device. The operation of the cover 200 with the alternate hood connection device is similar to the operation of the cover 100 using the hood lugs 150. However, the point at which the cover 200 is connected to the hood 445 of the automobile differs.

FIG. 11 illustrates an alternate embodiment of a hood connection device underneath the hood 445 of an automobile 400. As described above, the flexible body 170 contains a loop 165 at one end of the flexible body 170. The flexible body 170 is typically placed in the hood fender gap 465 underneath the hood 445. The loop 165 is placed facing generally upward. The flexible body 170 is typically placed prior to placing the cover and can be left in the fender gap 465 during normal use of the automobile 400.

FIG. 12 illustrates an alternate embodiment of a hood connection device underneath the hood 445 of an automobile 400. The hood 445 of the automobile 400 has been closed onto the flexible body 170, which is subsequently held in place by the closed hood 445. The loop 165 protrudes from the gap 450. As described above with respect to FIG. 3, the hooking device 160 can be hooked onto the loop 165. The covering process can be completed as described above with respect to FIGS. 5–10.

FIG. 13 illustrates an alternate embodiment of a hood connection device having a pull string 166. As described above with respect to FIG. 3, the loop 165 can optionally include a pull string 166. A handle 167 can also be connected to the pull string 166. The pull string 166 is used for those people who do not desire to have the loop 165 protruding from the gap 450 when the cover 200 is not in use. The pull-string 166 can therefore be used to pull the loop 165 into the gap 450. The pull string 166 can subsequently also be put into the gap 450 and the handle 167 can be placed adjacent the windshield 440 so that it can be easily accessed when the cover 200 is used.

When either of the cover embodiments 100, 200 are to be removed, the user 410 opens the doors 460 to free the cover and then removes the appropriate hood connection device. The user 410 can then fold the cover 100, 200 and placed the hood connection device on top of the body. The user 410 then takes the winder 300 and placed the tangs 320 on the body 105. The user 410 can then begin folding the body 105 over the tangs 420. When the user 410 has folded a majority of the body 105 onto the tangs 420, the user can optionally add the cord loop 140 and continue to roll the cover 100,200 onto the winder 300, typically ending with the trunk cords 130. At this point, the user 410 opens the trunk lid 415 to expose the trunk anchor 135 which can be rolled onto the winder 300. The cover 100, 200 and the winder 300 can then be stored in the trunk 405 or other suitable location.

As the above figures illustrate, the automobile is a car. However, any type of automobile is contemplated for use with the embodiments of the automobile covers described. Certain modifications may be necessary in order to accommodate other automobile types. For example, for large sports utility vehicles, the body 105 may have to be larger than the body 105 for use with a car. In addition, sports utility vehicles have a large rear door instead of a trunk lid. The trunk anchor, such as a rubber ball as described above can be placed in the large rear door similar to the trunk anchor described above. Alternately, two trunk anchors could be placed on either side of the large rear door, each trunk anchor connected to each trunk cord. For the sports utility vehicles, it may be convenient for the user to have the trunk cords permanently placed in the rear door. As such, the user could implement the trunk cords in two pieces as described above. In this embodiment, the cords can be separated into two separate cords, one connected to the body and the other connected to the trunk anchors. The two pieces of cords can be connected together by a hooking device such as a snap hook on one piece and a loop on the other piece. In a typical implementation, the cord piece connected to the body can be a shock cord, and the piece connected to the anchor can be non-elastic such as nylon. In this way, the non-elastic cord can remain connected to the permanently placed trunk anchors and the snap hooks can be used to connect to the non-elastic cord when the cover is placed on the sports utility vehicle.

In an alternate implementation, the embodiments of the covers described above can be flipped over to expose the black polyethylene side during winter months. In this way, the covers act as heat absorbers rather than heat reflectors when the aluminum reflective side is facing upwards.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An automobile cover kit, comprising:
   a car cover apparatus comprising,
      a main cover body having a hood end, a trunk end, an upper surface and a lower surface and adapted to cover an automobile cabin;
      connectors located on the hood end and the trunk end;
      trunk cords connected to the connectors on the trunk end;
      a trunk anchor connected to the trunk cords on ends of the trunk cords opposite the ends connected to the connectors, the trunk anchor being adapted to be placed in a trunk of the automobile;
      hood cords connected to the connectors on the hood end; and
      a winder having an elongated handle connected generally perpendicular to a cross bar and two tangs connected generally perpendicular to the cross bar, the winder being adapted to roll the cover onto the tangs.

2. The kit as claimed in claim 1 further comprising a hood connection device connected to the hood cords.

3. The kit as claimed in claim 2 wherein the hood connection device is a hood lug adapted to be connected to a gap between a hood of the automobile and a mating surface of the hood.

4. The kit as claimed in claim 2 wherein the hood connection device comprises:
   a hooking device connected to the hood cords; and
   an elongated flexible body having a loop adapted to be connected to the hooking device, the elongated flexible body being adapted to be placed into a hood fender gap of the automobile and the loop being adapted to protrude from a gap between a hood of the automobile and a mating surface of the hood.

5. The kit as claimed in claim 4 further comprising a pull-string connected to the loop and adapted to fit into the gap between the hood gap and the mating surface.

6. The kit as claimed in claim 1 further comprising a cord loop that is adapted to be connected to itself end to end and further adapted to be connected between the trunk cords.

* * * * *